US011667336B2

(12) United States Patent
Schalyo et al.

(10) Patent No.: US 11,667,336 B2
(45) Date of Patent: *Jun. 6, 2023

(54) FLAP ARRANGEMENT WITH A FLAP FOR A MOTOR VEHICLE (71) Applicant: Brose Fahrzeugteile SE & Co. Kommanditgesellschaft, Bamberg, Bamberg (DE)

(72) Inventors: Heino Schalyo, Altendorf (DE); Christoph Haberberger, Gößweinstein (DE); Vitali Wendland, Bamberg (DE); Adam Laczo, Bamberg (DE)

(73) Assignee: Brose Fahrzeugteile SE & Co. Kommanditgesellschaft, Bamberg

( * ) Notice: Subject to any disclaimer, the term of this patent is extended or adjusted under 35 U.S.C. 154(b) by 110 days.

This patent is subject to a terminal disclaimer.

(21) Appl. No.: 17/314,786

(22) Filed: May 7, 2021

(65) Prior Publication Data
US 2021/0347416 A1 Nov. 11, 2021

Related U.S. Application Data (63) Continuation-in-part of application No. 16/869,868, filed on May 8, 2020, now Pat. No. 11,536,074.

(51) Int. Cl.
E05F 15/00 (2015.01)
B62D 33/037 (2006.01)
B62D 33/027 (2006.01)
E05F 15/611 (2015.01)
B62D 33/03 (2006.01)

(52) U.S. Cl.
CPC ....... *B62D 33/037* (2013.01); *B62D 33/0273* (2013.01); *E05F 15/611* (2015.01); *B62D 33/03* (2013.01); *E05Y 2900/546* (2013.01)

(58) Field of Classification Search
CPC ...... E05D 11/08; E05F 15/627; E05F 15/614; E05F 15/611; B60J 5/108; B62D 33/0273; B62D 33/03; B62D 33/037; E05Y 2201/702; E05Y 2201/434; E05Y 2201/704; E05Y 2201/706; E05Y 2201/266; E05Y 2201/638; E05Y 2201/654; E05Y 2201/71; E05Y 2900/544; E05Y 2900/546
See application file for complete search history.

(56) References Cited

U.S. PATENT DOCUMENTS

6,994,363 B2 2/2006 Seksaria et al.
10,022,016 B1 7/2018 Streett
10,077,083 B1 9/2018 Survis et al.
(Continued)

*Primary Examiner* — Chi Q Nguyen
(74) *Attorney, Agent, or Firm* — Dickinson Wright PLLC (57) ABSTRACT A drive arrangement for adjusting a flap of a motor vehicle about a body including a motor, a drivetrain, and a freewheel mechanism. The drivetrain is disposed between the motor and the flap. The freewheel mechanism provided with a drive component including a transmitting element, and a driven component provided with a receiving element coupled to the transmitting element. During motoric movement of the flap between the closed and the open position over at least a portion of the pivot angle, the motor actuates the drive component and displaces the transmitting element, from a neutral position, conjointly with the receiving element along a displacement path.

26 Claims, 6 Drawing Sheets

(56) References Cited

U.S. PATENT DOCUMENTS

| | | | |
|---|---|---|---|
| 10,293,868 B2* | 5/2019 | Jergess | B62D 33/037 |
| 10,494,037 B2 | 12/2019 | Williams | |
| 10,920,472 B2* | 2/2021 | Trentin | E05D 7/1005 |
| 11,111,710 B2* | 9/2021 | Ulewicz | E05D 7/1072 |
| 2004/0124662 A1 | 7/2004 | Cleland et al. | |
| 2009/0302630 A1* | 12/2009 | Duffy | E05F 1/123 |
| | | | 296/57.1 |
| 2013/0278004 A1* | 10/2013 | Sackett | B62D 33/0273 |
| | | | 296/57.1 |
| 2014/0324251 A1 | 10/2014 | Hansen | |
| 2016/0222708 A1* | 8/2016 | Higgins | E05D 11/0018 |
| 2017/0089112 A1 | 3/2017 | Rosales et al. | |
| 2017/0274869 A1* | 9/2017 | Da Deppo | B62D 33/037 |
| 2018/0251164 A1* | 9/2018 | Jergess | B62D 33/037 |
| 2019/0211598 A1* | 7/2019 | Hemphill | B62D 33/03 |
| 2020/0040628 A1* | 2/2020 | Trentin | E05D 3/02 |
| 2020/0047821 A1* | 2/2020 | Santana | E05F 15/614 |
| 2020/0123816 A1 | 4/2020 | Taylor et al. | |
| 2020/0399943 A1* | 12/2020 | Ulewicz | B62D 33/0273 |
| 2021/0155297 A1 | 5/2021 | Lakerdas et al. | |
| 2021/0347416 A1 | 11/2021 | Schalyo et al. | |
| 2021/0371017 A1 | 12/2021 | Heins et al. | |
| 2022/0003025 A1 | 1/2022 | Scholz et al. | |
| 2022/0032854 A1 | 2/2022 | Burke | |

* cited by examiner

FLAP ARRANGEMENT WITH A FLAP FOR A MOTOR VEHICLE

CROSS-REFERENCE TO RELATED APPLICATIONS

This application is a continuation-in-part of U.S. application Ser. No. 16/869,868 filed May 8, 2020, the disclosure of which is hereby incorporated in its entirety by reference herein.

TECHNICAL FIELD

The present disclosure relates to a flap arrangement for use in a motor vehicle.

BACKGROUND

Motor vehicles may include a number of flaps such as a closing element. The flap may be a tailgate, a liftgate, a trunk lid, a back door, a front hood, a side door or the like. All those flaps are pivotable about flap pivot axis and can be adjusted between an open position and a closed position over a pivot angle.

SUMMARY

One or more objects of the present disclosure may be to provide a flap arrangement for a motor vehicle which is actuatable by a motor and by hand easily while providing a cost efficient assembly.

According to one or more embodiments, a flap arrangement that may include a drive arrangement provided with a freewheel mechanism that may include a drive component with at least one force transmitting element and a driven component with at least one force receiving element. Interacting with each other, the transmitting element and the receiving element transmit driving forces of the motor to the flap. By designing the freewheel mechanism in such a manner that in a neutral position of the transmitting element a manual movement of the flap and the receiving element respectively is possible without displacing the transmitting element, it is possible to freely move the flap by hand.

In detail, it is proposed that the drivetrain may include a freewheel mechanism, that the freewheel mechanism may include a drive component, in particular a driveshaft, with at least one force transmitting element, and a driven component, in particular a driven shaft, with at least one force receiving element assigned to a respective transmitting element, that during a motoric movement of the flap from its closed to its open position and/or from its open to its closed position over at least part of the pivot angle the motor by actuating, in particular rotating, the drive component displaces the transmitting element together with the receiving element along a displacement path, said motoric movement of the transmitting element starting from a neutral position, that after the motoric movement of the flap the transmitting element can be displaced back to the neutral position independent of the flap, that, when the transmitting element is in the neutral position, during a manual movement of the flap from its closed to its open position and/or from its open to its closed position over at least part of the pivot angle the flap by actuating, in particular rotating, the driven component displaces the receiving element without displacing, in particular without engaging, the transmitting element.

The receiving element may be displaced along the displacement path during the manual movement.

Motoric and the manual movement may move the flap in an opening or closing direction over the complete pivot angle of the flap.

The displacement path may be a circular path.

Claim 6 relates to the preferred relationship between the drive component and the transmitting element and the driven component and the receiving element.

The neutral position may be a load-free position. In this way, a stable freewheel mechanism easily allowing a manual and motoric movement can be reached.

One or more embodiments may describe the transmitting element and the receiving element and their interaction. As an example, one of these elements may be a disc shaped element, and the other one may be a hollow disc shaped element according to claim 11. They may include cams providing contours for transmitting the driving forces according to claim 12. They may also define an open space for respective other cams making a simple freewheel mechanism with few parts.

The receiving element may move over a freewheel angle during the movement of the flap which directly relates to the pivot angle and may even be equal to the pivot angle.

The flap arrangement may include a spring arrangement with a spring generating driving forces which in a preferred embodiment are balanced such that the flap may remain at least in an open position or a closed position without movement.

A coupling element may be disposed between the transmitting element and the receiving element. An advantage of such a coupling element is the possibility of providing greater freedom for the freewheel mechanism, if necessary, even allowing freewheeling for more than 360°.

A cam mechanism for the freewheel mechanism may be provided and may allow a large freedom of design while retaining the functional principle.

Further stability can be achieved by providing at least two coupling elements or two parts of a coupling element which may use the same cam path.

According to one or more embodiments, a drive arrangement for use with the flap arrangement is provided. According to the present invention, all explanations given with respect to the first teaching are fully applicable to the second teaching.

BRIEF DESCRIPTION OF THE DRAWINGS

In the following, exemplary embodiments of the invention are explained with respect to drawings. In the drawings

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known flap arrangement is described in US 2017/0089112 A1. The know flap arrangement includes a downwardly opening flap of a pick-up truck. The flap has a drive arrangement for motorically adjusting the flap between an open position and a closed position in either direction. The drive arrangement may include a motor and a drivetrain for transmitting the driving forces of the motor to the flap.

While the known flap arrangement works well for motorized adjustment of the flap, many users require the flap to be openable and closeable manually. There are known coupling arrangements allowing flaps to be moved by hand, by decoupling the drivetrain between the flap and the motor. However, these couplings are usually complex assemblies. Additionally, many of them require the user to move the flap with a minimum force and do not allow exceeding a maximum force or speed of movement of the flap. In particular flaps of pick-up trucks are often opened and closed manually fast due to the often small size of the flaps.

Figure 1:
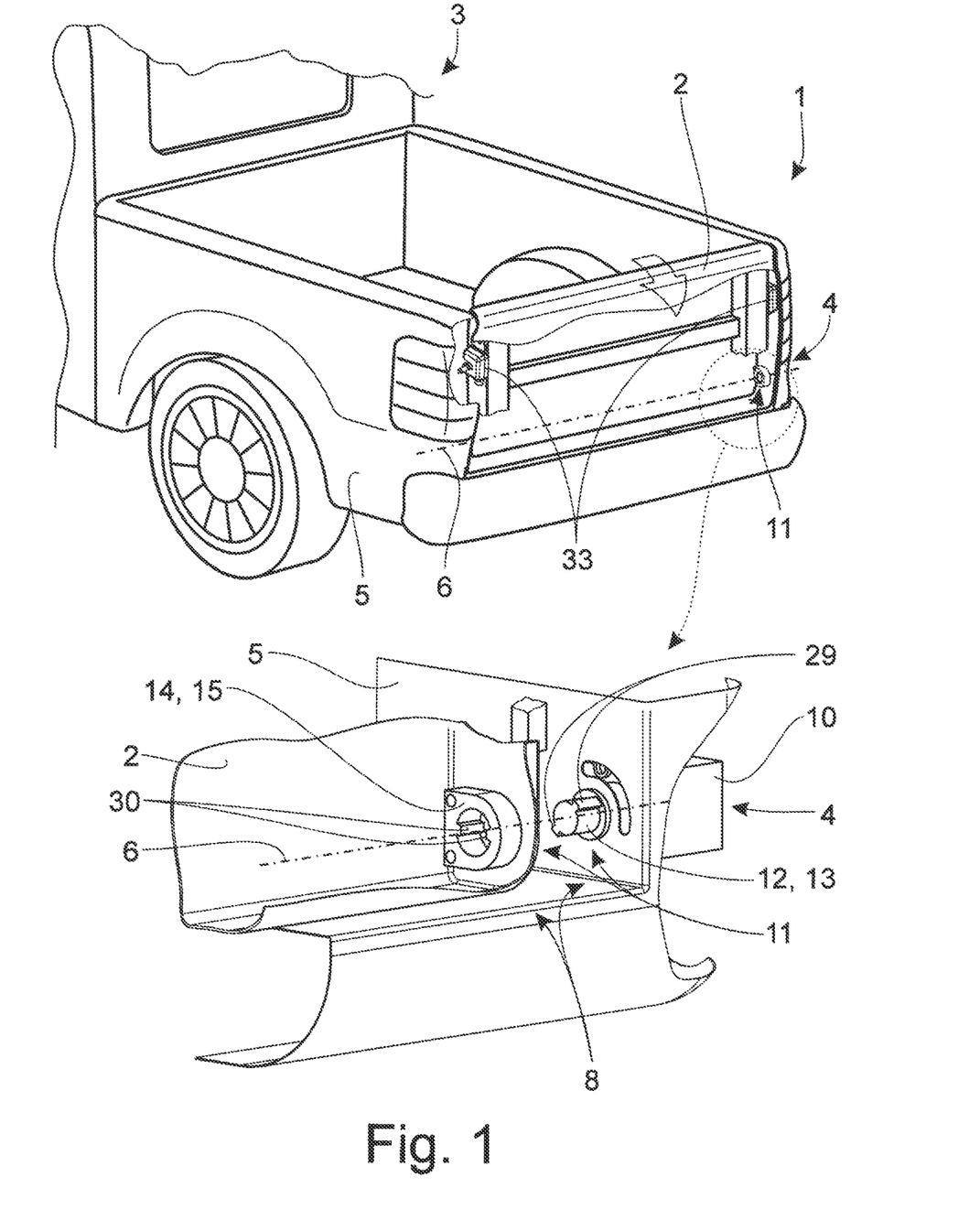
FIG. 1 shows a motor vehicle with the proposed flap arrangement comprising a proposed drive arrangement.
Figure 3:
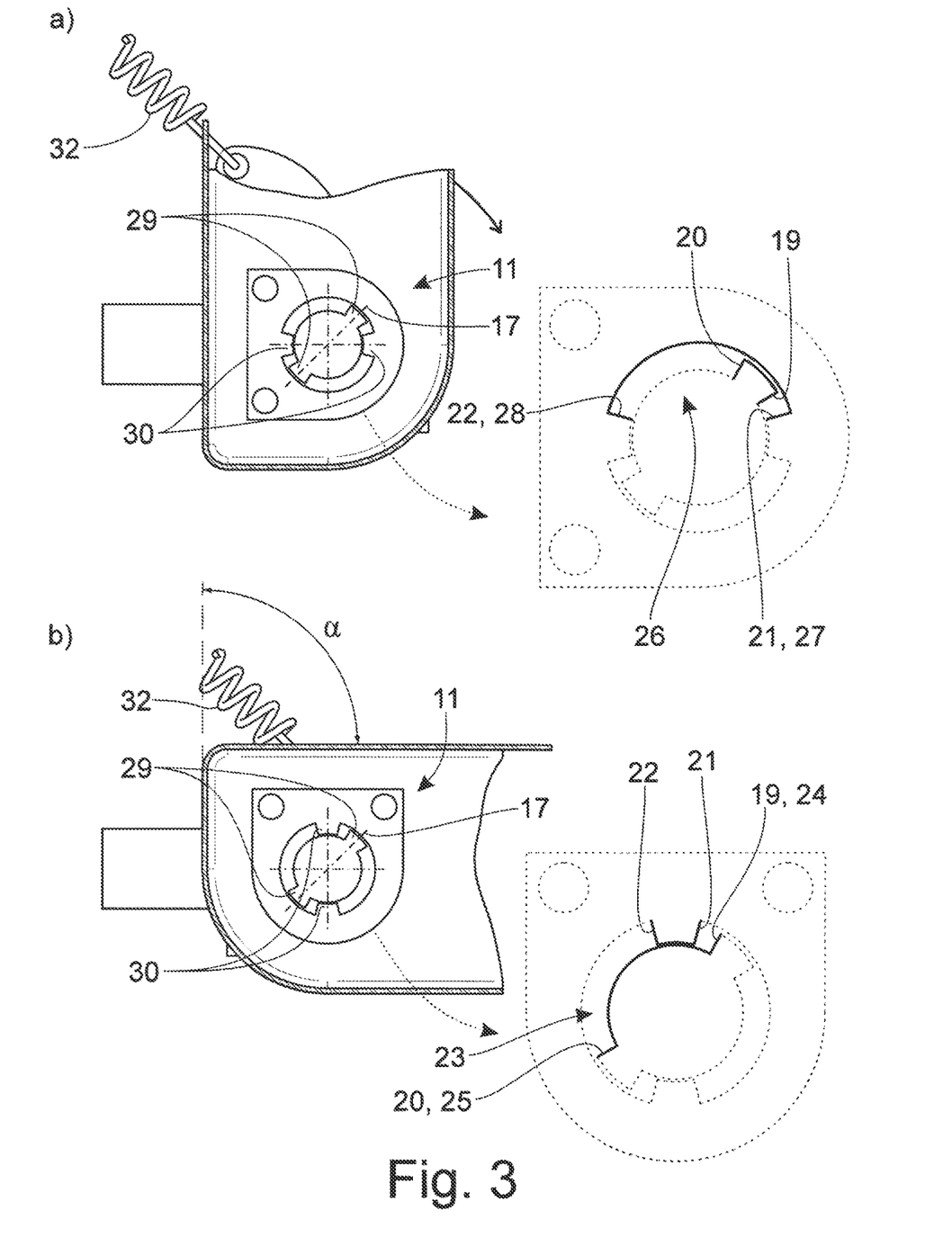
FIG. 3 shows schematically the open position of the flap in a) and the closed position of the flap in b) while the transmitting element is in the neutral position.

FIG. 1 shows a flap arrangement 1 with a flap 2 for a motor vehicle 3 and with at least one, drive arrangement 4 for adjusting the flap 2. In the shown mounted state the flap 2 is mounted on a body 5 of the motor vehicle 3 to be pivotable about a flap pivot axis 6. The flap 2 can be adjusted between an open position shown in FIG. 3b) and a closed position shown in FIGS. 1 and 3a) over a pivot angle α.

Presently, the expression "flap" is to be understood in a broad sense. It includes any kind of pivotable doors of a motor vehicle 3 such as tailgates, liftgates, trunk lids, back doors, front hoods, side doors or the like. In the preferred embodiment, the flap 2 is designed as a pick-up tailgate, which opens downwards in the direction of the gravity.

Figure 2:
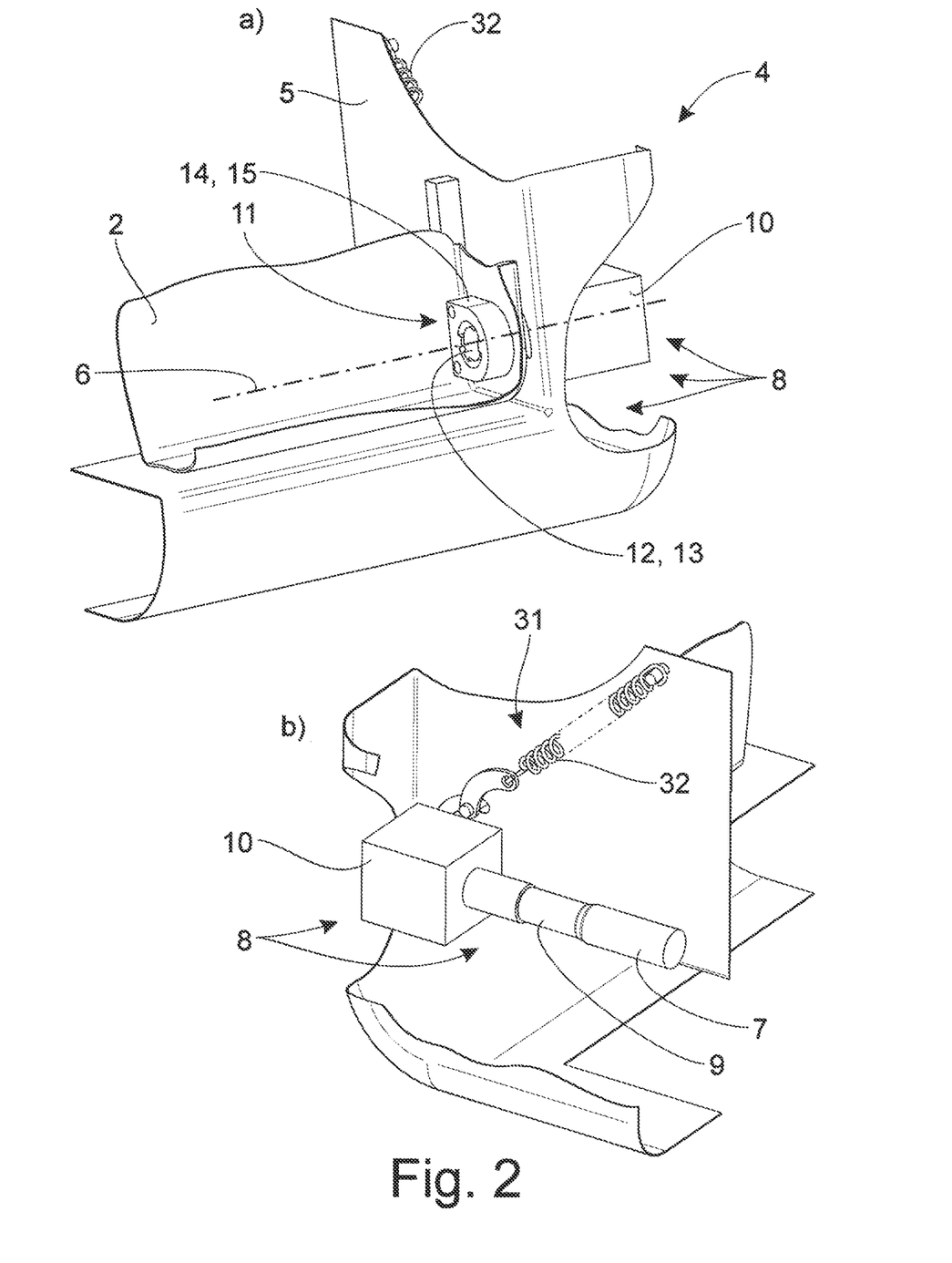
FIG. 2 shows a detail of the proposed flap arrangement from two different perspectives.

The drive arrangement 4 may include an electrical motor 7 for generating and transmitting driving forces to adjust the flap 2. The motor 7 is shown in FIG. 2b). The drive arrangement 4 also may include a drivetrain 8, which is a series of mechanical components between the motor 7 and the flap 2, as shown, or the body 5 of the motor vehicle 3, an alternative not shown but equally preferred, for transmitting the driving forces.

The drivetrain 8 may comprise at least one gear 9, 10. Here and preferably as shown in FIG. 2. the drivetrain 8 may include a reduction gear 9 and an angular gear 10. The reason for the angular gear 10, in this case, is, that the motor 7 is here and preferably located on the body 5 of the motor vehicle 3. As the preferred motor 7 is an elongated motor the available space in the body 5 of the motor vehicle 3 can be better used if the motor 7 is aligned orthogonal to the flap 2. This embodiment, however, is not to be understood as limiting the invention. In particular, the motor 7 may also be arranged inside the flap 2.

The drivetrain 8 may include a freewheel mechanism 11. The freewheel mechanism 11 may include a drive component 12, in particular a drive shaft, with at least one force transmitting element 13, and a driven component 14, in particular a driven shaft, with at least one force receiving element 15 assigned to a respective transmitting element 13. FIG. 1 shows the freewheel mechanism 11 in a disassembled state when the flap 2 is not mounted to the body 5 of the motor vehicle 3. FIG. 2a) shows the freewheel mechanism 11 in an assembled state.

Figure 4:
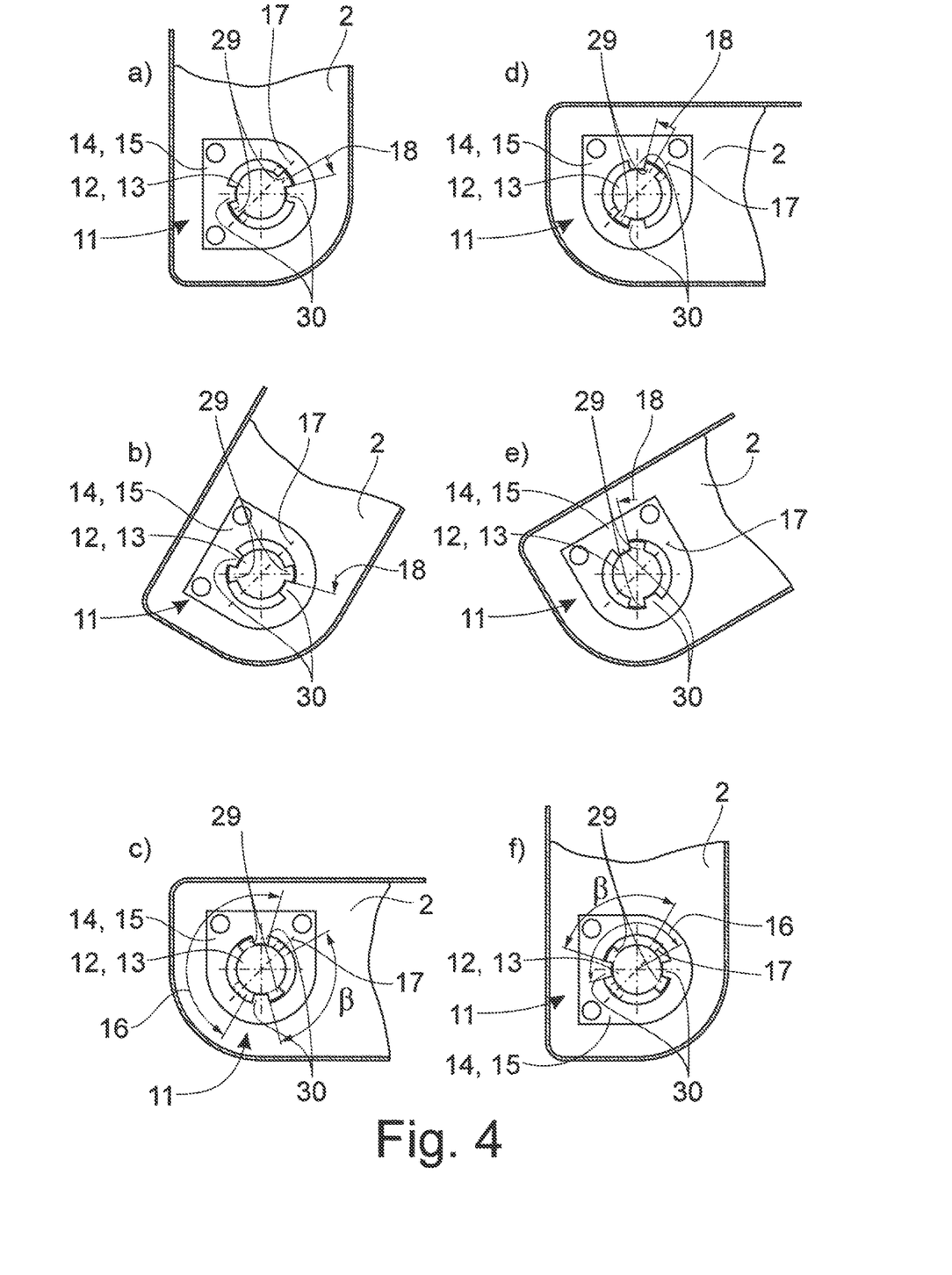
FIG. 4 shows schematically the motoric opening and closing of the flap.

The functioning of the freewheel mechanism 11 can be seen in FIGS. 3 and 4. During a motoric movement of the flap 2 from its closed to its open position (from FIG. 3a) to FIG. 3b)) and or from its open to its closed position (from FIG. 4b) to FIG. 4a)) over at least part of the pivot angle α the motor 7 actuating, in particular rotating, the drive component 12 displaces the transmitting element 13 together with the receiving element 15 along a displacement path 16. The motoric movement is shown schematically in FIG. 4.

The motoric movement of the transmitting element 13 starts from a neutral position 17 shown in FIG. 3 and in dashed lines in FIG. 4. While the details of the freewheel mechanism 11 will be discussed in depth later, the general concept of the motoric opening and closing can be seen in FIG. 4. From FIG. 4a) to FIG. 4c), starting from the neutral position 17, the transmitting element 13 turns clockwise, engaging the receiving element 15 in a manner yet to be described and turning the receiving element 15 clockwise until reaching the opening position shown in FIG. 4c), thereby moving the flap 2.

After the motoric movement of the flap 2, the transmitting element 13 can be displaced back to the neutral position 17 independent of the flap 2. The transmitting element 13 may be displaced back to the neutral position 17 after every motoric movement into at least the fully open and/or the fully closed position of the flap 2. The motoring closing of the flap from FIG. 4d) to FIG. 4f) therefore may start again from the neutral position 17 in FIG. 4d). By turning the transmitting element 13 counter-clockwise the receiving element 15 and with it, the flap 2, may reach the fully closed position in FIG. 4f).

As can be seen in FIG. 3, when the transmitting element 13 is in the neutral position 17, during a manual movement of the flap 2 from its closed to its open position and/or from its open position to its closed position over at least part of pivot angle α the flap 2 by actuating, in particular rotating, the driven component 14 displaces the receiving element 15, such as along the displacement path 16 in the direction of the neutral position 17 of the force transmitting element 13, without displacing, in particular without engaging, the transmitting element 13. It is directly obvious from FIG. 3 that the flap 2 can be displaced over the full 90° of the pivot angle α without the receiving element 15 coming into contact with the transmitting element 13.

As an example, the motoric movement may be a complete, motoric opening and/or a complete, motoric closing of the flap 2. Preferably, the flap 2 can be opened and closed completely motorically. Additionally or alternatively, the manual movement may be complete, manual opening or closing of the flap 2.

The flap 2 and the motor 7 may displace the receiving element 15 along the exact same part of the displacement path 16 during the manual opening and the motoric opening respectively. Additionally or alternatively, the flap 2 and the motor 7 displace the receiving element 15 along the exact same part of the displacement path 16 during the manual closing and the motoric closing respectively. Here and preferably the flap 2 and the motor 7 displace the receiving element 15 along the displacement path 16 in a first direction (clockwise) during the manual and motoric opening and along the displacement path 16 in a second direction opposite to the first direction during the manual and motoric closing (counter-clockwise).

As can be seen in the figures the displacement path 16 is here and preferably a circular path. In the preferred embodiment, the displacement path 16 goes circularly around a geometrical axis, here and preferably the geometrical flap pivot axis 6, for the complete 360°. However, as shown, the transmitting element 13 and the receiving element 15 exhibit a symmetrical design. As will be described later, it is also possible to have a different design which would not use the complete 360°. For this reason, in FIGS. 4c) and f) the displacement path, once for opening and once for closing, is only shown for one side of the transmitting and receiving elements 13, 15.

It may be the case that the motor 7 rotates the drive component 12 and the driven component 14 each around the geometrical axis, preferably the same geometrical axis and/or the flap pivot axis 6, during the motoric movement, and/or, that the flap 2 rotates the driven component 14 around the geometrical axis of the drive component 12 during the manual movement.

The transmitting element 13 may be fixedly coupled to the drive component 12. Alternatively, the drive component 12 and the transmitting element 13 are one piece. Additionally or alternatively, the receiving element 15 is fixedly coupled to the driven component 14 or the driven component 14 and the transmitting element 15 are one piece. In one or more embodiments, the elements 13, 15 and respective components 12, 14 are one piece each.

In the neutral position 17, here and preferably, the transmitting element 13 is load-free. The flap 2 does not provide any load on the transmitting element 13 in the neutral position 17. Preferably, in the neutral position 17 the transmitting element 13 is not in engagement with the receiving element 15. It may be the case that at the beginning of the motoric opening and/or closing the transmitting element 13 comes into engagement with the receiving element 15, in particular after passing over a short distance 18. As an example, the drivetrain 8 only transmits the driving forces from the motor 7 to the flap 2 or the body 5 of the motor vehicle 3 when the transmitting element 13 and receiving element 15 are in engagement. The engagement may be a direct or an indirect engagement. There may be another component between the transmitting element 13 and the receiving element 15, for example, a dampening component. Then the transmitting element 13 and the receiving element 15 would only be in indirect engagement, different from the direct engagement shown in the figures.

As has already been hinted, not the complete shown transmitting and receiving elements 13, 15 are necessary to provide the first function of the present teaching. This is shown schematically in FIG. 3 on the right where the functioning of the present teaching can be seen in two alternative sketches which will be described in more detail now.

As an example, the transmitting element 13 may include a transmitting opening contour 19 and a transmitting closing contour 20. The receiving element 15 may comprise a receiving opening contour 21 and a receiving closing contour 22. Here and preferably each of these contours 19-22 is present on the respective element 13, 15 twice. This can be seen by looking at the sketches in FIG. 3, where the contours 19-22 are marked differently between the top sketch and the bottom sketch without changing the underlying design of the transmitting and receiving elements 13, 15.

During the motoric opening the transmitting and receiving opening contours 19, 21 are here and preferably in engagement with each other and the transmitting and receiving closing contours 20, 22 are not in engagement with each other. During the motoric closing the transmitting and receiving closing contours 20, 22 may be in engagement with each other, while the transmitting and receiving opening contours 19, 21 are not in engagement with each other. Here and preferably during the manual opening the closing and opening contours 19, 21 are not in engagement with each other. Here and preferably during the manual opening and closing the opening contours 19, 21 and the closing contours 20, 22 are not in respective engagement with each other when the transmitting element is in the neutral position 17.

As an example, the transmitting element 13 forms an open space 23 for the receiving element 15. This is shown in the bottom right sketch of FIG. 3. The open space 23 is limited by a first wall 24 and by second wall 25. The first wall 24 may be the transmitting opening contour 19 and the second wall 25 may be the transmitting closing contour 20. The receiving opening contour 21 and the receiving closing contour 22 may run in the open space 23.

It may be the case that during the motoric movement the motor 7 displaces the open space 23 with the transmitting element 13, in particular radially around the geometrical axis of the drive component 12, and causally by displacing the open space 23 displaces the receiving element 15. Here and preferably during the manual movement, the flap 2 displaces the receiving element 15 relative to the opening space 23, in particular displaces the receiving opening and/or closing contour 21, 22 in the open space 23, without displacing the open space 23 when the transmitting element 13 is in the neutral position 17.

As the top right sketch of FIG. 3 shows the receiving element 15 may form an open space 26 for the transmitting element 13. As can be seen, here and preferably, the transmitting element 13 and the receiving element 15 each form an open space 23, 26. The open space 26 of the receiving element 15 is also limited by a first wall 27 and by a second wall 28. Here and preferably the first wall 27 is the receiving opening contour 21 and the second wall 28 is the receiving closing contour 22. The transmitting opening contour 19 and the transmitting closing contour 20 may run in the open space 26. Here and preferably during the motoric movement, the motor 7 displaces the transmitting element 13, such as radially around the geometrical axis of the drive component 12, and causally by displacing the transmitting element 13 displaces the open space 26. During the manual movement, the flap 2 may displace the open space 26, without displacing the transmitting element 13 when the transmitting element 13 is in the neutral position 17.

With hindsight to FIGS. 1 and 2 it can be seen that the drive component 12 and the driven component 14 are driveshafts rotatable around a geometrical axis, here and preferably the geometrical flap pivot axis 6. Once of the transmitting element 13 and the receiving element 15 can be a disc shaped element and the other a hollow disc shaped element which partially face each other and here and preferably overlap in axial direction. In the case shown in the figures the drive component 12 is the disc shaped element and the driven component 14 is the hollow disc shaped element. As can also be seen, the disc-shape relates to the cross-section necessary for the functioning of the freewheel mechanism 11. Here and preferably the hollow disc shaped element is arranged radially partially or completely around the disc shaped element.

As an example, the drive component 12 may include at least one, preferably two, cam elements 29 extending radially from its geometrical axis towards the driven component 14. Additionally or alternatively, the disc shaped element may comprise at least one cam element 29 which may then extend radially from its geometrical axis towards the hollow disc shaped element.

The driven component 14 and/or the hollow disc shaped element may comprise one, preferably two, cam elements 30 extending inwards towards its geometrical axis and/or towards the disc shaped element respectively. Here and preferably there are at least two cams 29, 30 on the disc shaped elements or the hollow disc shaped element.

The cam elements 29, 30 may comprise the transmitting and receiving opening and closing contours 19-22. Here and preferably the cam elements 29 of the drive component 12 and/or the disc-shape element comprise the transmitting opening and closing contours 19, 20 and the cam elements 30 of the driven component 14 and/or the hollow disc shaped element may comprise the receiving opening and closing contours 21, 22.

During contact between the opening and closing contours 19-22 during the motoric movement the contours may run parallel to each other, thereby being in contact with each other over an area, in particular the complete area, of the respective contour 19-22.

As an example, the cams 30, in this case at least two cams 30, of the driven component 14 and/or the hollow disc shaped element form the open space 23 of the receiving element 15 or the transmitting element 13 and/or the cams 29, in this case at least two cams 30, of the drive component 12 and/or the disc shaped element form the open space 26 of the receiving element 15 or the transmitting element 13.

With regards to FIG. 3 the flap 2 and the motor 7 respectively may displace the receiving element 15, such as the receiving opening and closing contours 21, 22, during the manual and/or motoric movement of the flap 2 along the circular displacement path 16 over a freewheel angle β. The freewheel angle β is, here and preferably, the pivot angle α multiplied with a factor. Preferably the factor is smaller than or equal to 4, more preferably smaller than or equal to 2, more preferably exactly 1 and/or greater than or equal to 0.25, preferably greater than or equal to 0.5. The pivot angle α and/or the freewheel angle β are here and preferably greater than 45°, more preferably greater than 70° and more preferably more or less equal to 90°, and/or, smaller than 135°, more preferably smaller than 110°.

As an example, the open space 23, 26 allows a displacement of the receiving element 15 greater than the actual displacement of the receiving element 15 during any intended movement of the flap 2. For example, the open space 23, 26 may have an angular width of 160° while the freewheel angle β may be 90°.

The drive arrangement 4 may further comprise a spring arrangement 31 comprising a spring 32 connected to the flap 2 and the motor vehicle body 5. The spring 32 may generate and transfer driving forces to the flap 2, such as against a gravity direction.

As the freewheel mechanism 11 allows free movement of the flap 2 even during the motoric movement in the same direction as the motoric movement, in the preferred embodiment, it may be the case that in the load-free and non-motor actuated state of the flap 2 the driving forces of the spring 32 and the gravity forces acting on the flap 2 are balanced such that the flap 2 remains in at least the open position and/or the closed position. In this way, the flap 2 won't move out of its own accord and especially won't fall down to the open position. As an example, the flap 2 is balanced in any position. To achieve this, a brake, a friction arrangement or a dampener arrangement could be provided in addition to the spring 32, too. The spring 32 also allows using a smaller motor 7 because the motor 7 does not have to move the complete weight of the flap 2.

As is also shown in FIG. 1, the flap arrangement 1 may be provided with at least one motor vehicle lock 33 such as to hold the flap 2 in its closed position.

Figure 5:
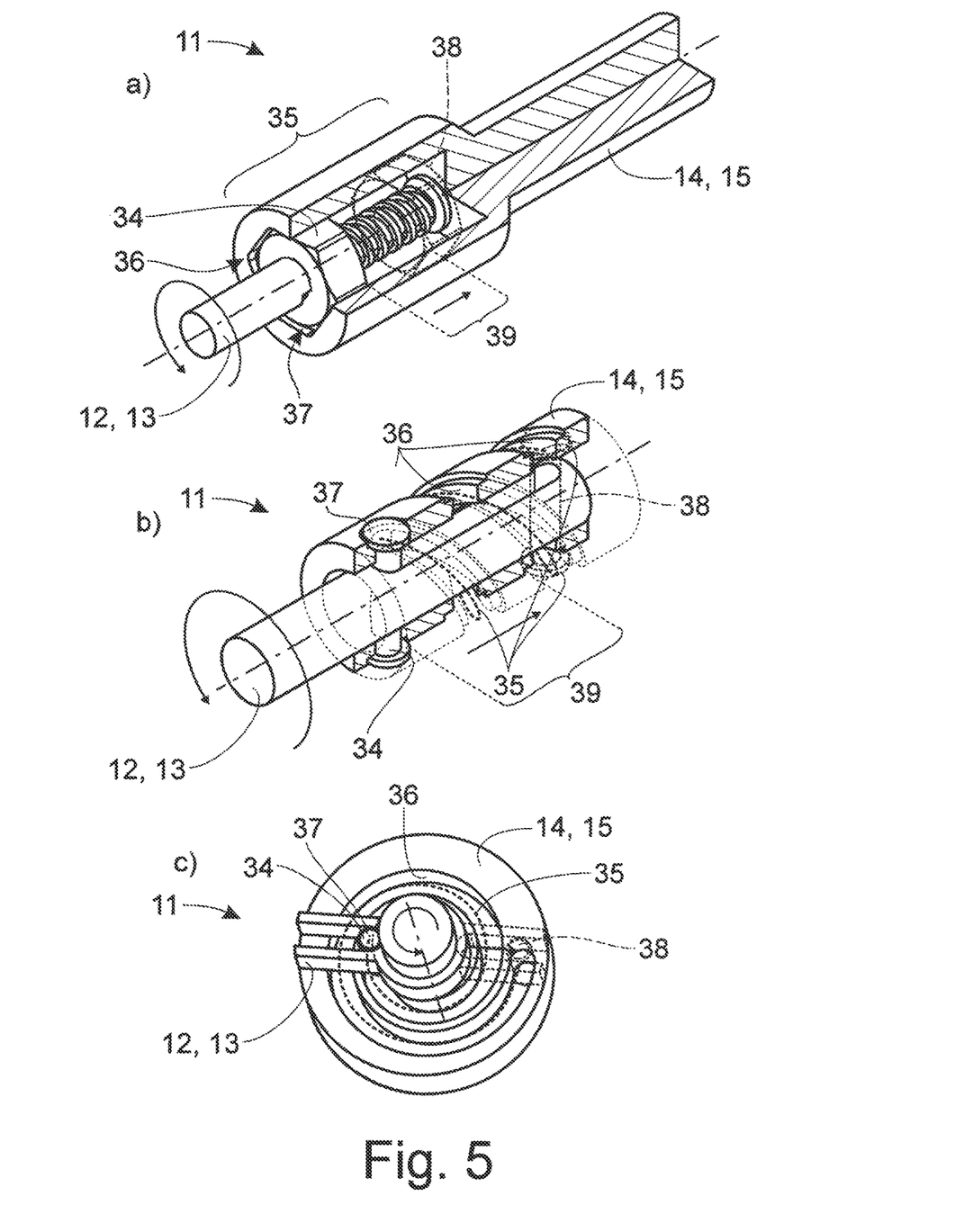
FIG. 5 shows further variants of the freewheel mechanism and FIG. 6 shows yet a further variant of the freewheel mechanism.
Figure 6:
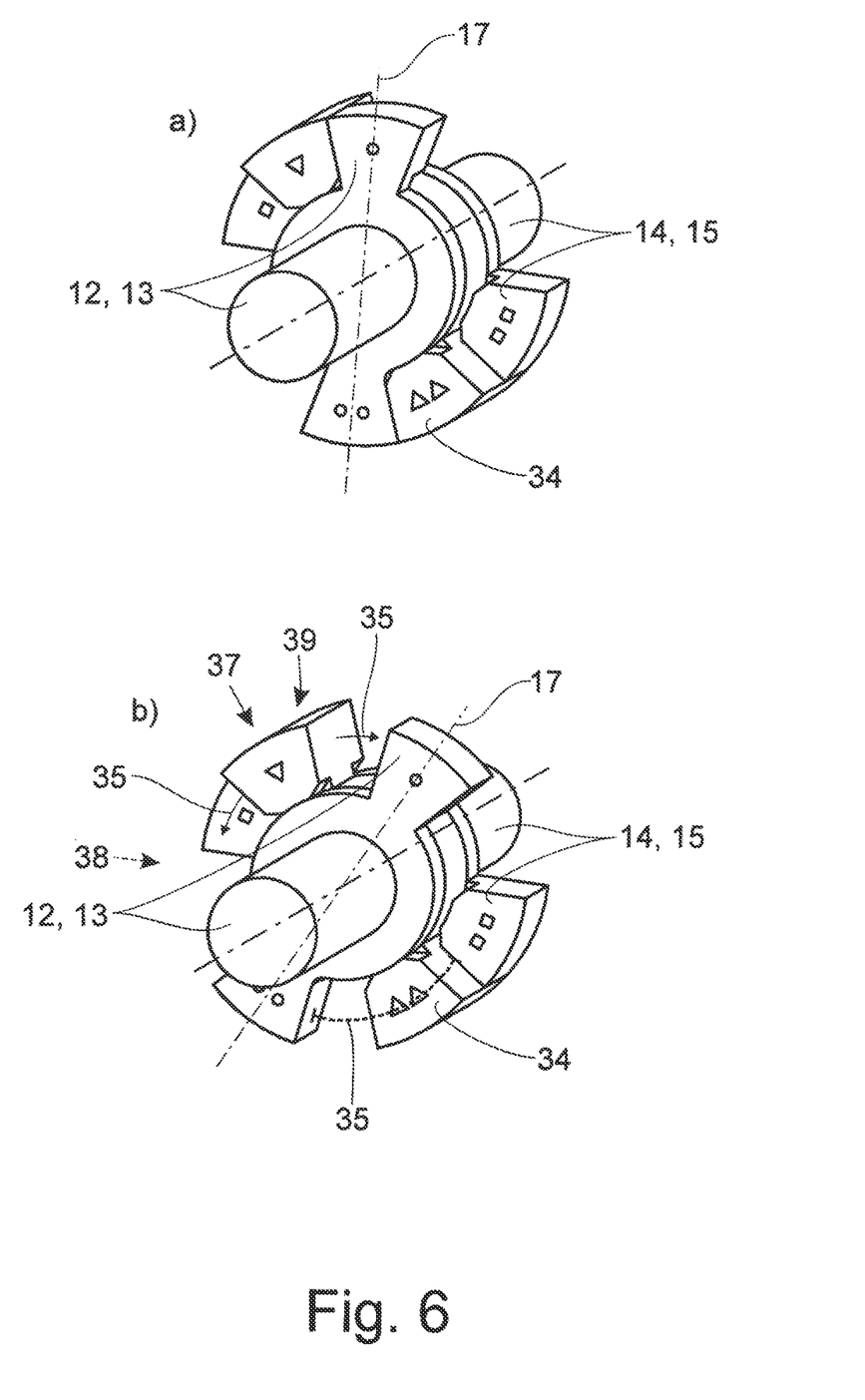

Focusing now on the embodiments of FIGS. 5 and 6, the transmitting element 13 and the receiving element 15 may be coupled with each other during the motoric movement of the flap 2 and decoupled from each other during the manual movement of the flap 2. It may then be the case that the transmitting element 13 and the receiving element 15 are coupled with each other during the motoric movement of the flap 2 via a coupling element 34. FIGS. 5 and 6 show different embodiments based on this principle. The coupling element 34 may be a screw nut, a rod or bar, a pin or the like. All of these embodiments have in common that the freewheeling between the transmitting element 13 and the receiving element 15 may be possible over a degree of more than 90°, even more than 360°, if desired.

In FIG. 5a), turning of the transmitting element 13 or the receiving element 15 in one direction or both, dependent on the position of the screw nut, will result in a freewheeling of the respective element 13, 15 until the screw nut reaches an end position. Only then are driving forces transmitted from the drive element 12 to the driven element 14.

In FIG. 5b) the same function is achieved by a rod led in a long hole and along a cam path 35 in a cam opening 36.

In both cases, the freewheeling of either the transmitting element 13 or the receiving element 15 leads to a linear movement of the coupling element 34, particular along the flap pivot axis 6 or a rotation axis of the drive component 12 and/or the driven component 13. In FIG. 5c) a similar principle to FIG. 5b) with a spiral cam path 35 is realized without the linear movement using a single plane.

FIG. 6 shows a two-stage freewheel mechanism 11 similar to the embodiment of FIGS. 1 to 4, however with a coupling element 34 allowing for a freewheel angle of more than 180° in both directions.

Here and preferably, during the motoric movement of the flap 2 the coupling element 34 is coupled to, in particular in contact with, the transmitting element 13 and the receiving element 15. During the manual movement of the flap 2 the coupling element 34 can be, in particular is, decoupled from, and in particular not in contact with, the transmitting element 13 and/or the receiving element 15. In the embodiments of FIGS. 5 and 6 the coupling element 34 is always coupled to the transmitting element 13 or the receiving element 15 during freewheeling and to both during motoric movement of the flap 2.

The coupling element 34 can be movable along a cam path 35 defined relative to the transmitting element 13 and/or the receiving element 15. The cam path 35 may be formed by a cam opening 36 in the transmitting element 13 or the receiving element 15. In FIG. 5a) the cam path 35 and cam opening 36 are defined by the longitudinal opening for the screw nut and are linear. In FIGS. 5b) and c) the spiral opening for the bar or pin respectively defines the cam path 35 and the cam opening 36. In FIG. 6 the cam path 35 is defined relative to both the transmitting element 13 and the receiving element 15 and constantly changing.

As an example, the cam path 35 includes a first coupling position 37 and preferably a second coupling position 38 distant from the first coupling position 37, and at least one, preferably a range of, decoupled position or positions 39. The first coupling position 37 may be used for motoric opening of the flap 2 while the second coupling position 38 may be used for motoric closing of the flap 2 or vice versa.

Accordingly, the coupling element 34 in the first coupling position 37, and the second coupling position 38, couples the transmitting element 13 and the receiving element 15 only in either a direction for opening the flap 2 or a direction for closing the flap 2 while allowing freewheeling of the receiving element 15 and preferably of the transmitting element 13 in the opposite direction.

The first coupling position 37 and the second coupling position 38 can be located, as shown, at opposite ends of the cam path 35 and the range of decoupled positions 39 can be located between the first coupling position 37 and the second coupling position 38. The cam path 35 may be significantly shorter than shown in the FIGS. 5 and 6. In particular, a manual movement of the flap 2 over the whole range of movement of the flap 2 may move the coupling element 34 from the first coupling position 37 to the second coupling position 38 or over at least 40%, preferably at least 50%, more preferably at least 90%, of the cam path 35.

The cam path 35 can be circular or spiral, in particular around the flap pivot axis 6 or a rotation axis of the drive component 12 and/or of the driven component 13. The cam path 35 may also be linear. Here and preferably the cam path 35 allows for freewheeling of the driven component 14 and preferably of the drive component 12 for more than 90°, preferably more than 100°, more preferably more than 180°, of rotation.

During motoric opening and motoric closing of the flap 2 the transmitting element 13 and the receiving element 15 can be coupled to each other by different coupling elements 34 or different sections of the coupling element 34 as shown in FIGS. 5b) and 6. Preferably both coupling elements 34 or both sections of the coupling element 34 are located in the cam path 35 spaced apart from each other.

It may be the case that during the manual movement of the flap 2 the receiving element 15 displaces the cam element 34 through a section of the cam path 35 without displacing the transmitting element 13.

The return of the transmitting element 13 after the motoric movement of the flap 2 into the neutral position 17, if provided, may displace the cam element 34 into the decoupled position 39 or one of the decoupled positions 39 by moving the cam element 34 through the cam path 36 and/or by moving the cam path 36 relative to the cam element 34.

According to another embodiment, a drive arrangement 4 is provided. The drive arrangement 4 may be used in the flap arrangement 1 of the present disclosure. All explanations given with respect to the first teaching are fully applicable to the second teaching.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

1 flap arrangement
2 flap
3 motor vehicle
4 drive arrangement
5 motor vehicle body
6 flap pivot axis
7 motor
8 drivetrain
9 reduction gear
10 angular gear
11 freewheel mechanism
12 drive component
13 transmitting element
14 driven component
15 force receiving element
16 displacement path
17 neutral position
18 short distance
19 closing contours
19 opening contours
20 closing contours
20 transmitting closing contour
21 receiving opening contour
22 receiving closing contours
23 open space
24 first wall
25 second wall
26 open space
27 first wall
28 second wall
29 cam elements
30 cam elements
31 spring arrangement
32 spring
33 one motor vehicle lock
34 coupling element
35 cam path
36 cam opening
37 first coupling position
38 second coupling position
39 decoupled positions While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A flap arrangement including a flap for use in a motor vehicle including a body, the flap arrangement comprising:
a drive arrangement configured to adjust the flap when the flap is in a mounted state mounted to the body, to pivot the flap about a flap pivot axis between an open position and a closed position over a pivot angle,
wherein the drive arrangement includes
a motor configured to generate drive forces to adjust the flap,
a drivetrain disposed between the motor and either the flap or the body and configured to transmit the drive forces,
a freewheel mechanism provided with a drive component including,
a transmitting element, and
a driven component provided with a receiving element selectively coupled to the transmitting element,
wherein during motoric movement of the flap from at least one of the closed position to the open position over at least a portion of the pivot angle and the open position to the closed position over at least a portion of the pivot angle, the motor actuates the drive component and displaces the transmitting element, from a neutral position, conjointly with the receiving element along a displacement path, wherein after the motoric movement of the flap, the transmitting element is selectively configured to return to the neutral position independent of the flap, wherein in response to the transmitting element being in the neutral position and a manual movement of the flap between the closed position and the open position over at least a portion of the pivot angle, the flap actuates the driven component and displaces the receiving element without displacing the transmitting element.

2. The flap arrangement of claim 1, wherein in response to the transmitting element being in the neutral position, during a manual movement of the flap between the closed position and the open position, the flap actuates the driven component and displaces the receiving element along the displacement path towards the neutral position without displacing the transmitting element.

3. The flap arrangement of claim 2, wherein the flap and the motor displace the receiving element along a common portion of the displacement path during manual movement of the flap and the motoric movement of the flap.

4. The flap arrangement of claim 2, wherein the displacement path is circular.

5. The flap arrangement of claim 1, wherein during the motoric movement of the flap, the flap moves along the entire pivot angle from at least one of the open position and the closed position.

6. The flap arrangement of claim 1, wherein the transmitting element is fixedly coupled to or integrally formed with at least one of the drive component and the driven component, or the receiving element is fixedly coupled to the driven component.

7. The flap arrangement of claim 1, wherein in response to the transmitting element being in the neutral position, the transmitting element is load-free.

8. The flap arrangement of claim 1, wherein the transmitting element includes a transmitting opening contour and a transmitting closing contour, the receiving element includes a receiving opening contour and a receiving closing contour, wherein during motoric opening of the flap, the transmitting and receiving opening contours engage each other and the transmitting closing contour and the receiving closing contour are disengaged from one another, during the motoric closing of the flap, the transmitting closing contour and the receiving closing contour engage each other and the transmitting opening contour and the receiving opening contour are disengaged from one another.

9. The flap arrangement of claim 8, wherein the transmitting element defines a first open space, limited by a first wall and a second wall, and configured to receive the receiving element, wherein the first wall is the transmitting opening contour and the second wall is the transmitting closing contour, and the receiving opening contour and the receiving closing contour move in the first open space.

10. The flap arrangement of claim 9, wherein the first open space allows a displacement of the receiving element greater than an actual displacement of the receiving element during any intended movement of the flap.

11. The flap arrangement of claim 1, wherein the receiving element defines a second open space limited by a third wall and a fourth wall and configured to receive the transmitting element, wherein the third wall is the receiving opening contour and the fourth wall is the receiving closing contour and the transmitting opening contour and the transmitting closing contour move in the second open space.

12. The flap arrangement of claim 1, wherein the drive component and the driven component are each drive shafts rotatable about an axis, and at least one of the transmitting element and the receiving element is a disc shaped element and the other of the least one of the transmitting element and the receiving element is a hollow disc shaped element at least partially facing the disc shaped element, and wherein the hollow disc shaped element is arranged to at least partially radially surround the disc shaped element.

13. The flap arrangement of claim 1, wherein the drive component includes a first number of cam elements extending radially from an axis of the drive component towards the driven component, and the driven component includes a second number of cam elements extending inwardly toward an axis of the driven component, and wherein the first number of cam elements and the second number of cam elements form a transmitting opening contour, a receiving opening contour, a transmitting closing contour, and a receiving closing contour.

14. The flap arrangement of claim 13, wherein the second number of cams form the open space defined by either receiving element or the transmitting element or the first number of cams form an open space defined by either the transmitting element or the receiving element.

15. The flap arrangement of claim 14, wherein as the flap moves, the flap and the motor respectively displace the receiving element along the displacement path over a freewheel angle based on the pivot angle multiplied by a factor that is less than or equal to 4.

16. The flap arrangement of claim 1, wherein the drive arrangement includes a spring arrangement provided with a spring connected to the flap and the body and configured to generate and transfer driving forces to the flap.

17. The flap arrangement of claim 1, wherein the transmitting element and the receiving element are coupled with each other, by a coupling element, during motoric movement of the flap and decoupled from each other during manual movement of the flap.

18. The flap arrangement of claim 17, wherein during the manual movement of the flap, the coupling element is decoupled from at least one of the transmitting element and the receiving element.

19. The flap arrangement of claim 17, wherein the coupling element is configured to move along a cam path defined by a cam opening defined by the transmitting element or the receiving element.

20. The flap arrangement of claim 19, wherein in response to the coupling element being in a first coupling position, the coupling element couples the transmitting element to the receiving element in response to the flap moving in a first direction, and in response to the flap moving in a second direction, opposite the first direction, the first coupling decouples the transmitting element from the receiving element.

21. The flap arrangement of claim 19, wherein the coupling element is configured to move along the cam path from the first coupling position to a second coupling position, and the first coupling position and the second coupling position are disposed at opposite ends of the cam path and a number of decoupled positions are located between the first coupling position and the second coupling position.

22. The flap arrangement of claim 21, wherein the cam path has a circular shape, spiral shape, or linear shape, or wherein the cam path is configured such that the driven component is configured to freewheel.

23. The flap arrangement of claim 19, wherein after the motoric movement of the flap, the transmitting element returns to the neutral position and displaces the cam element to one or more decoupled positions by at least one of moving the cam element through the cam path and moving the cam path relative to the cam element.

24. The flap arrangement of claim 17, wherein during motoric movement of the flap, the transmitting element and the receiving element are coupled to each other by a number coupling elements or a number of sections of the coupling element each spaced apart from another along the cam path.

25. The flap arrangement of claim 24, wherein during the manual movement of the flap, the receiving element displaces the cam element along a section of the cam path without displacing the transmitting element.

26. A drive arrangement for use in the flap arrangement of claim 1.

* * * * *